United States Patent [19]

Beale, Jr. et al.

[11] 3,928,438

[45] Dec. 23, 1975

[54] PROCESS FOR PREPARATION OF UREA AUTOCONDENSATION PRODUCT

[75] Inventors: Alvin F. Beale, Jr.; John M. Lee, both of Lake Jackson, Tex.

[73] Assignee: The Dow Chemical Company, Midland, Mich.

[22] Filed: Apr. 7, 1972

[21] Appl. No.: 242,221

Related U.S. Application Data

[63] Continuation-in-part of Ser. No. 865,208, Oct. 9, 1969, abandoned.

[52] U.S. Cl. ............ 260/553 B; 260/553 R; 426/69
[51] Int. Cl.² ........................................ C07C 127/24
[58] Field of Search ................................ 260/553 B

[56] References Cited
UNITED STATES PATENTS

| | | | |
|---|---|---|---|
| 2,111,234 | 3/1938 | Zellhoefer | 260/615 B |
| 2,122,129 | 6/1938 | Cox | 260/615 B |
| 2,146,324 | 2/1939 | Zellhoefer et al. | 260/615 B |
| 2,271,873 | 2/1942 | Perkins et al. | 260/615 B |
| 2,918,467 | 12/1959 | Hibbitts et al. | 260/249.7 |

FOREIGN PATENTS OR APPLICATIONS

| | | | |
|---|---|---|---|
| 1,068,693 | 11/1959 | Germany | 260/553 B |

*Primary Examiner*—James O. Thomas, Jr.
*Assistant Examiner*—G. Breitenstein
*Attorney, Agent, or Firm*—Gary D. Street; Walter J. Lee

[57] ABSTRACT

Urea is pyrolyzed under controlled temperature conditions of from about 110° to about 210°C. in the presence of a polyether carrier liquid to provide an autocondensation product mass rich in biuret and having a low residual content of unconverted urea. Other autocondensation pyrolyzates, less desired in the product when it is used as a protein supplement for ruminant feeds, are co-produced only in low tolerable amounts.

5 Claims, No Drawings

PROCESS FOR PREPARATION OF UREA AUTOCONDENSATION PRODUCT

CROSS-REFERENCE TO RELATED APPLICATION

The present application is a continuation-in-part of copending application Ser. No. 865,208 filed Oct. 9, 1969, now abandoned.

BACKGROUND OF THE INVENTION

The present invention relates to the preparation of biuret and more particularly is concerned with an improved pyrolysis process for preparing biuret from urea.

The preparation of biuret by pyrolysis of urea, as well as other methods, has long been known in the art. Many of these preparations are summarized in an article "Biuret and Related Compounds" published in Chemical Reviews, 56, p. 95–197 (1956). Of the various methods for preparing biuret set forth in this reveiw article it was indicated that although difficulties are present, large scale preparations have been developed based on the pyrolysis of urea.

Olin (U.S. Pat. No. 2,370,065) teaches a process for preparing biuret wherein urea is heated to a temperature above its melting point but below the decomposition temperature of the biuret and by-product ammonia formed by condensation of urea is swept from the reaction zone with a stream of a hydrocarbon gas. In the practice of the Olin process, the hydrocarbon gas, preferably toluene, is introduced during the reaction period below the surface of the molten urea and the ammonia-hydrocarbon gas mixture rapidly removed from the reaction zone. The ammonia is removed from the resulting hydrocarbon sweep gas-ammonia mixture and the ammonia depleted hydrocarbon gas returned to the reaction zone for removal of further quantities of ammonia.

Harmon (U.S. Pat. No. 2,145,392) teaches a process for preparing biuret by heating urea at a temperature of 130° to 205°C. at a pressure of not substantially greater than 200 mm. of mercury. This allegedly provides a mixture of urea and biuret from which the biuret is subsequently separated.

Kamlet (U.S. Pat. No. 2,768,895) lists a number of references directed to the preparation of biuret by pyrolysis of urea and teaches a process for directly pyrolyzing urea in the absence of a catalyst at a temperature between 120° and 205°C. This effects substantial autocondensation of the urea to produce a mixture of unreacted urea and an admixture of urea autocondensation products, the total mixture consisting of 30 to 70 percent urea with biuret being a predominant component of the autocondensation products. The Kamlet process further includes extracting urea from the resulting product with a selective solvent for urea, e.g. preferably water, to leave a product containing 60 to 90 percent of the admixed autocondensation products with the remainder being urea. The so-extracted product mass is taught to be suitable for use as a protein supplement for ruminant feeds.

Formaini et al (U.S. Pat. No. 3,057,918) teaches a cyclic process for preparing biuret in which urea is heated at from 135° to 200°C. and the resulting crude pyrolytic product quenched and digested in hot aqueous ammonia until no triuret remains. The liquid mass is then cooled to fractionally crystallize biuret which is removed. The ammonia is stripped from the residual solution whereupon cyanuric acid crystallizes. This solid product is separated from the residual aqueous solution and the solution concentrated by removal of water. The resulting concentrate is recycled with additional urea for subsequent pyrolysis.

Colby (U.S. Pat. No. 2,861,886), Kamlet, (referenced hereinbefore) and other publications attest to the utility of biuret as a feed composition additive for ruminants. This additive provides usable nitrogen to supplement the protein content of feeds from natural sources. Moreover, the use of biuret as a nitrogen supplement is preferred since it is assimilated by ruminant animals at a slower rate than urea-based supplements and consequently avoids the danger of ammonia toxicity to the animal.

While the pyrolysis of ureaa to yield biuret is well-known in the art, there are many disadvantages associated with such methods. The principal disadvantage lies in the low total conversion of urea to the desired biuret product. Thus, methods wherein urea is directly heated at higher temperatures or for longer periods of time have been employed in attempts to increase the conversion of urea to biuret. It is known, however, that higher reaction temperatures favor the formation of cyanuric acid and a higher total cyanuric acid plus triuret content in the pyrolysis product. Conversely, lower reaction temperatures favor the formation of biuret and a higher biuret content in the pyrolysis product.

Moreover, regardless of the prior art direct pyrolysis methods employed, a point is soon reached at which the formed biuret is being converted to higher condensation products faster than more biuret is being formed. Under such conditions, the highest yield of biuret is reached when the pyrolysis product reaches a point at which it contains about 50% biuret. Further heating will give more conversion of urea, but will also cause more of the biuret to become further reacted to form higher condensation products which soon become a solidified mass. Heat transfer through the solidified mass is difficult. If a relatively low temperature (less than 120°C) is employed to avoid higher condensation products, the rate is much too slow to be economically feasible.

In order to obtain a product having a high biuret concentration and desirably low concentrations of urea it is possible to extract, with water, a urea pyrolyzate thereby substantially removing water-soluble urea and/or other water-soluble ingredients from the biuret.

It is therefore a principal object of the present invention to provide an improved process for production of biuret by pyrolysis of urea.

It is also an object of the present invention to provide a process for preparing biuret by pyrolysis of urea wherein auto-condensation by-product formation, particularly cyanuric acid, is held to a low level.

It is another object of the present invention to provide a process for preparing a biuret product by pyrolysis of urea wherein good conversion of urea to biuret is realized in a relatively short reaction period.

These and other objects and advantages of the process of the present invention readily will become apparent from the detailed description presented hereinafter.

GENERAL SUMMARY

In general, the present process comprises heating urea in the presence of a polyether carrier liquid at an elevated temperature of from about 110°C. to about 210°C. and for a period of time which provides for substantial conversion of urea to biuret while simultaneously minimizing the formation of undesirable autocondensation by-products and recovering the biuret containing product mass from the carrier liquid.

DESCRIPTION OF PREFERRED EMBODIMENTS

In the actual practice of one preferred embodiment of the present invention, ordinarily a mixture of urea and a glycol diether carrier liquid (hereinafter referred to as glycol ether) are heated at a temperature of from above 150°C. to about 210°C., usually from above 150°C. to about 180°C. for a period of from about 10 minutes to about 2 hours, ordinarily from about 30 minutes to about 1 hour. Within this disclosed temperature range and process period, the actual time employed for a given operation usually varies inversely with the temperature used. At higher temperatures, the conversion rate of urea to biuret is increased but this is accompanied by an acceleration in the rate of formation of other urea autocondensation products, e.g. triuret, ammelide and cyanuric acid, which are not desired when the biuret product is to be used as a protein supplement ruminant feed additive. Following this initial processing, the temperature of the reaction mass is lowered to a temperature within the range of from about 115°C. to below 150°C., usually to from about 120°C. to about 140°C. and maintained at this temperature until the biuret content of the product is at a predetermined level, usually at a maximum about 57 percent of the total weight of product mass (or until the urea content is reduced to as low as about 30%). Ordinarily, the heating stage at the lower temperature is continued for a period of from about 2 hours to about 6 hours, usually from about 3 to about 4 hours. Unexpectedly, it has been found that in using the glycol ether carrier, good conversion of urea to biuret is realized in this reaction period, which is considerably shorter than the times required for the prior art methods of direct pyrolysis of urea with and without carrier liquid. Correspondingly, the co-production of other autocondensation by-products is substantially entirely eliminated or held to a tolerable low level. It has also been found that a particulate biuret product is easily precipitated from the reaction medium by the addition of water while the solubles (including urea) are held in solution.

Alternatively, the temperature of the reaction mass after the initial higher temperature heating stage can be progressively lowered over a period of from about 3 to about 6 hours to a final temperature of from about 130°C. to about 140°C. The reaction mass can be maintained within the final temperature range until a desired biuret concentration is realized.

This rate of temperature lowering assures optimum conversion of urea to biuret with formation of only minimal quantities of other autocondensation products, e.g. ammelide, triuret and cyanuric acid. Following completion of the reaction period, the biuret rich product mass is separated from the glycol ether, usually by conventional liquid-solid separatory procedures and the ether recovered and ordinarily recycled for reuse. Beneficially, the reaction mixture can be flushed or purged during the reaction period with an inert gas, e.g. nitrogen or argon, low boiling inert hydrocarbons, such as, for example, the saturated aliphatic compounds having from one to about six carbon atoms (i.e., methane, ethane, straight and branched chain propanes, butanes, pentanes, and hexanes), and the like to aid in removal of evolved by-product ammonia therefrom. This by-product readily can be separated from the purge gas and recovered. The relative quantities of urea and glycol ether to be employed in the reaction mass can be varied. For optimum efficiency in handling, heat consumption, reactant contact, product recovery, etc., the relative proportions of urea:ether usually range on a weight percent basis from about 90:10 to about 10:90. Usually, the mixture contains from about 20 to about 50 weight percent of the ether. At glycol ether contents of less than about 10 weight percent stirring difficulties sometimes may be encountered. With reaction mixtures containing excessively large amounts of ether carrier liquid, i.e., much greater than above 80 percent, increased expense, e.g. heating and handling costs, can be encountered without providing any marked increase in product yield or process efficiency.

Conveniently urea is introduced into an ether which previously has been heated and is maintained at a predetermined reaction temperature. Alternatively, the ether and urea can be mixed and the resultant mixture then heated to the predetermined reaction temperature.

The use of a glycol ether as a carrier liquid has been found to provide at a given temperature an increased rate of conversion of urea to biuret thereby reducing the reaction time. This in turn reduces the formation of other urea autocondensation products. Additionally, the ether carrier provides for ready escape of by-product ammonia from the reaction mass but has been found to substantially eliminate loss of the urea reactant. Another advantage of the glycol ether carrier is that it acts as a heat transfer medium thereby providing for close control of the reaction temperature; this is particularly effective in minimizing cyanuric acid formation. A further unexpected advantage is the fact that the ether serves to protect the surfaces of reactors and material handling equipment from direct contact with reaction products which could have a corrosive affect thereon. Greater mobility of biuret and urea within the reaction mass during the process also is realized.

Glycol ethers suitable for use in the process of the present invention are those materials which have a density less than that of the solids reaction mass and which are liquid at the reaction temperatures employed and preferably have a freezing or gelling point below about 20°C. These ethers are inert to urea and its autocondensation pyrolyzate products as well as to the ammonia evolved during the process.

Glycol ethers found useful in the instant invention as media for the urea pyrolysis are the polyethers conforming to the generic formula $R'—O+R—O+_nR''$ where $n$ is an integer ranging from one to six, R is ethyl or propyl, R' and R'' are alkyl radicals containing from one to four carbon atoms. The polyethers suitable for use in the practice of the instant invention are further characterized as having a boiling point of not less than about 110°C. and preferably not less than 140°C. Most preferred are those compounds which have a boiling point sufficiently high to provide for operation of the process at temperatures as high as 200°–210°C. In the above formula, where $n$ is 1, it is preferred that R' and R'' be alkyl radicals containing at least two carbon atoms each. Where $n$ is 2 or more, it is preferred that R' and R'' be alkyl radicals containing one or two carbon atoms. It is also preferred that R be $C_2H_4$, though compounds having $R=C_3H_6$ are also operable. In all the above named specific instances, it is least preferred to have R' and R'' as butyl radicals.

The compounds included in the generic formula illustrated above are commonly known as glycol diethers or polyglycol diethers, the preparation of which is widely known and taught in the literature.

The above named polyethers useful in the instant invention may be mixtures of two or more of such polyethers and may be polyethers wherein R' and R'' are the same or different.

Representative glycol ethers which have been found to be particularly suitable for use as carrier liquids in the practice of the present invention are: ethylene glycol diethyl ether (f.p. (freezing point) minus 74°C, b.p. (boiling point) 121.4°C.); ethylene glycol dibutyl ether (f.p. minus 69.1°C.; b.p. 203.3°C.); diethylene glycol dimethyl ether (f.p. minus 69.0°C.; b.p. 162°C.); diethylene glycol diethyl ether (f.p. minus 44.3°C.; b.p. 188.9°C.); diethylene glycol dibutyl ether (f.p. minus 60.2°C.; b.p. 245.6°C.); triethylene glycol dimethyl ether (f.p. minus 45°C.; b.p. 216°C.); tetraethylene glycol dimethyl ether (f.p. minus 27°C.; b.p. 275.8°C.).

The following Example will serve to further illustrate the process of the present invention but is not meant to limit it thereto.

EXAMPLE

A reaction vessel equipped with an agitator, a thermometer, and a nitrogen purge dip-leg was charged with 451 gms. of tetraethylene glycol dimethyl ether and 722 gms. of urea. The mixture was heated by using a heating mantle. The rate of heating was such that about 5 minutes was required to reach 180°C. during which time the urea melted and dissolved and a nitrogen purge of 3 liter/min. was commenced through the dip-leg and into the solution. The temperature was held at 180°C. for 20 minutes, then the reaction mixture was cooled to 152°C. and held there for 50 minutes (including the few minutes required to drop from 180°C. to 152°C.). The temperature was then lowered to 140°C. for 3.5 hours (including the few minutes required to drop from 150°C. to 140°C.). The nitrogen purge was continued throughout the run.

Following the reaction period, the mixture was poured into 184 gms. of water (room temperature) whereupon the biuret product precipitated. The resulting liquidsolid slurry was centrifuged and the solids were separated, washed with 75 ml. of water, and analyzed. The product had the following composition:

| Biuret | 88.3% |
|---|---|
| Urea | 1.8% |
| Solvent | 2.1% |
| Ammonium Carbonate | 1.7% |
| Triuret and titratables | 6.0% |

The glycol ether centrifugate was heated to evaporate and remove the water. Thereafter the so-treated ether was found to be re-usable in the process by adding fresh urea feed and heating the mixture to form more biuret along with small percentages of coproducts.

In a manner similar to that described for the foregoing Example, a biuret product can be prepared by pyrolysis of urea carried in ethylene glycol diethyl ether, ethylene glycol dibutyl ether, diethylene glycol dimethyl ether, diethylene glycol diethyl ether, diethylene glycol dibutyl ether, triethylene glycol dimethyl ether, tetraethylene glycol dimethyl ether and the like wherein the reaction mix proportions, temperature and process times are maintained within the operable range set forth herein and further such that the glycol ether carrier liquid is in its liquid state. Further, the glycol ethers have a density less than that of the solids reaction mass, (i.e., the urea reactant and also the biuret product prepared) in order that the reaction mass can be suspended therein.

We claim:

1. A process for preparing a biuret product which comprises:

providing a reaction mixture of urea in a glycol diether carrier liquid, the relative proportions of urea to diether on a weight basis ranging from about 90:10 to about 10:90, said glycol diether corresponding to the formula $R'$—O$+$R—O$+_n$R'' wherein R is ethyl or propyl, R' and R'' are alkyl radicals containing from one to four carbon atoms, and $n$ is an integer ranging from one to six, said ethers being further characterized as having a boiling point of no less than 110°C and a density less than that of urea, heating said reaction mixture, thereby dissolving the urea, initially at a temperature of from above 150°C to about 210°C for a period of from about 10 minutes to about 2 hours and cooling to a temperature within the range of from about 115°C to below 150°C for a period of time which provides for substantial conversion of said urea to a product high in biuret while simultaneously minimizing formation of other urea autocondensation byproducts, and contacting the resulting product mixture with water to precipitate the biuret product and recovering the solid biuret product from the residual liquid.

2. The process as defined in claim 1 wherein the initial heating of the reaction mixture is at from about 150°C. to about 180°C. and the heating at the lower temperature is at from about 120°C. to about 140°C. for a period of from about 2 to about 6 hours.

3. The process as defined in claim 1 wherein the glycol diether carrier liquid is ethylene glycol diethyl ether, ethylene glycol dibutyl ether, diethylene glycol dimethyl ether, diethylene glycol diethyl ether, diethylene glycol dibutyl ether, triethylene glycol dimethyl ether, or tetraethylene glycol dimethyl ether.

4. The process as defined in claim 3 wherein the urea:glycol diether reaction mixture contains on a weight basis from about 20 to about 50 weight percent of the diether.

5. The process as defined in claim 1 wherein the glycol diether is tetraethylene glycol dimethyl ether and the urea:ether reaction mixture contains about 60 weight percent urea and about 40 weight percent of said ether, the reaction mixture being heated for a period of about 30 minutes at about 180°C., cooled to about 150°C. and maintained at this temperature for a period of about 1 hour, cooled to about 140°C. and maintained at this temperature for about 3 ½ hours, and recovering a biuret rich product.

* * * * *

UNITED STATES PATENT OFFICE
CERTIFICATE OF CORRECTION

PATENT NO. : 3,928,438
DATED : December 23, 1975
INVENTOR(S) : A. F. Beale, Jr.; J. M. Lee It is certified that error appears in the above-identified patent and that said Letters Patent are hereby corrected as shown below:

Col. 2, line 17, please correct "ureaa" to --urea--.

Col. 4, line 5, After the word "recovered" a new paragraph should begin with -- The relative ...--.

Col. 5, line 50 There should be a dash between the words "liquid solid".

Signed and Sealed this

Seventh Day of September 1976

[SEAL]

Attest:

RUTH C. MASON
Attesting Officer

C. MARSHALL DANN
Commissioner of Patents and Trademarks